United States Patent [19]

Inoue et al.

[11] 4,069,918

[45] Jan. 24, 1978

[54] TOOL STORAGE MAGAZINE

[75] Inventors: Katsuo Inoue, Nagoya; Yoji Kamiya, Anjo, both of Japan

[73] Assignee: Toyoda-Koki Kabushiki Kaisha, Japan

[21] Appl. No.: 797,820

[22] Filed: May 18, 1977

[51] Int. Cl.² .............................................. A47F 3/08
[52] U.S. Cl. .......................................... 211/1.5; 29/568
[58] Field of Search ...................... 211/1.5, 69, 60 T; 29/568, 26 R, 40, 39; 408/35

[56] References Cited

U.S. PATENT DOCUMENTS

| 3,191,260 | 6/1965 | Jorgensen .................... 211/1.5 UX |
| 3,286,344 | 11/1966 | Brainard et al. ....................... 29/568 |
| 3,473,419 | 10/1969 | Ollearo .................................. 408/35 |
| 3,564,662 | 2/1971 | Dold .............................. 211/60 T X |
| 3,564,943 | 2/1971 | Kavanagh ............................. 408/35 |
| 3,691,899 | 9/1972 | Antonietto ........................ 408/35 X |

FOREIGN PATENT DOCUMENTS 370,727  8/1963  Switzerland .......................... 211/69

*Primary Examiner*—Ramon S. Britts
*Attorney, Agent, or Firm*—Oblon, Fisher, Spivak, McClelland & Maier

[57] ABSTRACT

A tool storage magazine for a machine tool with an automatic tool change apparatus comprises a plurality of tool sockets for holding tools which are pivotally supported on a rotatable magazine plate by means of spherical bearing members. The tool sockets are usually held in outwardly inclined positions, but are movable into a horizontal position for an automatic tool change operation, when indexed to a tool change position.

4 Claims, 2 Drawing Figures

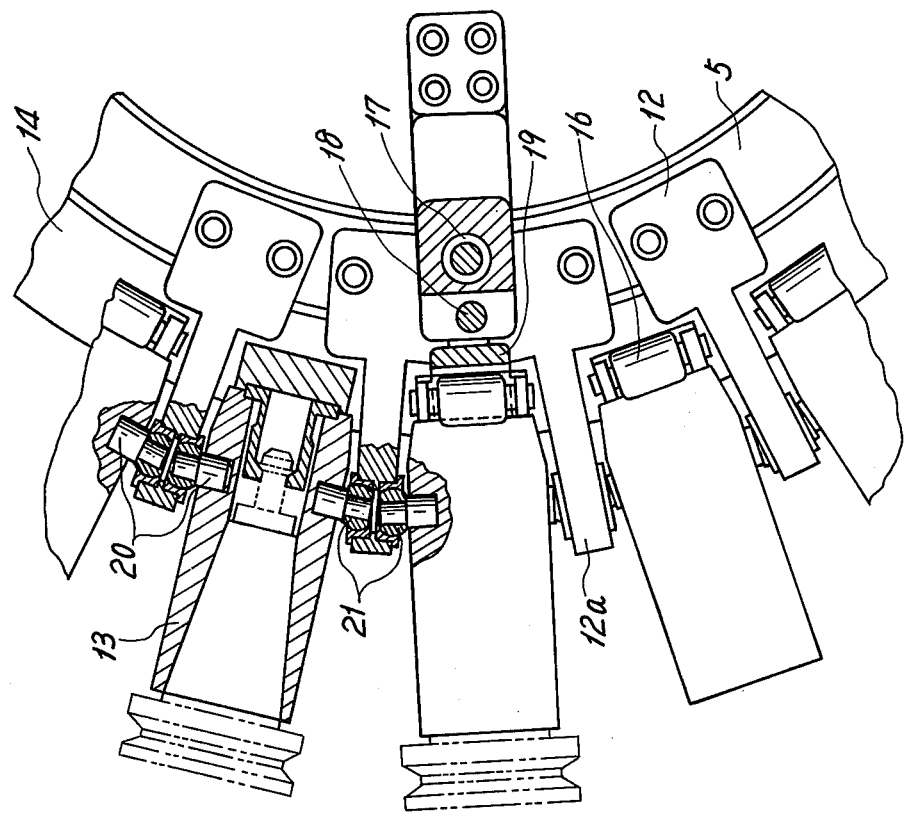

TOOL STORAGE MAGAZINE

BACKGROUND OF THE INVENTION

1. Field of the Invention

The present invention relates to a tool storage magazine for a machine tool with an automatic tool change apparatus, and, more particularly, to an improved pivotal support for each tool socket stored in the tool storage magazine.

2. Description of the Prior Art

There has heretofore been provided a tool storage magazine for a machine tool capable of exchanging tools between a spindle and the tool storage magazine, wherein a rotary magazine plate is driven by index drive means, a plurality of tool sockets are equi-spacedly arranged and pivotally supported on the rotary magazine plate in the circumferential direction thereof, and a required tool socket is pivoted into a horizontal plane for an automatic tool change operation when indexed to a tool change position. In this conventional tool storage magazine, the pivotal support for each tool socket is effected by two support pins, one being fitted into a bore formed at one side of a holding block and the other being fitted into a bore formed at the opposite side of another adjacent holding block.

In order to arrange a plurality of tool sockets circumferentially on the magazine plate in equi-spaced relationship, the bores for the support pins have to be formed on the holding block with the axes thereof being intersected with each other at a predetermined angle. However, it is quite troublesome and difficult to make such intersected bores on each holding block with sufficient accuracy. If there is any machining error in making such intersected bores, the tool socket cannot be precisely supported.

SUMMARY OF THE INVENTION

It is therefore an object of the present invention to provide a new and improved tool storage magazine, comprising a plurality of tool sockets which are pivotally supported by means of spherical bearing members with sufficient accuracy.

Another object of the present invention is to provide a new and improved tool storage magazine wherein the two opposite bores are formed coaxially on a holding block in a simple machining operation to receive respective spherical bearing members for pivotal support of a tool socket.

Briefly, according to the present invention, these and other objects are achieved by providing a tool storage magazine for a machine tool with an automatic tool change apparatus, which comprises a magazine base, a magazine plate rotatably supported on the magazine base, drive means for rotating the magazine plate, a plurality of holding blocks mounted on the magazine base in a circumferential direction, each holding block having bores on opposite sides thereof, a spherical bearing member received in each bore of each holding block, a plurality of tool sockets to be pivotally supported in equi-spaced relationship with each other in a circumferential direction for holding tools, each tool socket being arranged between two adjacent holding blocks and having bores on opposite sides thereof, a support pin fitted at one end thereof into the spherical bearing member to be pivotable relative to the associated holding block and fitted at the other end thereof into the bore of the associated tool socket, first means for holding tool sockets in outwardly inclined positions, second means for rendering the first means inoperative at a tool change position, and third means for moving any one of the tool sockets positioned at the tool change position from the inclined position to a horizontal position for an automatic tool change operation.

BRIEF DESCRIPTION OF THE DRAWINGS

The foregoing and other objects and many of the attendant advantages of the present invention will be more fully appreciated as the same becomes better understood by reference to the following detailed description when considered in connection with the accompanying drawings, in which:

FIG. 2 is a fragmentary plan view, partly in section, taken along the lines II—II of FIG. 1.

DETAILED DESCRIPTION OF THE PREFERRED EMBODIMENT

Figure 1:
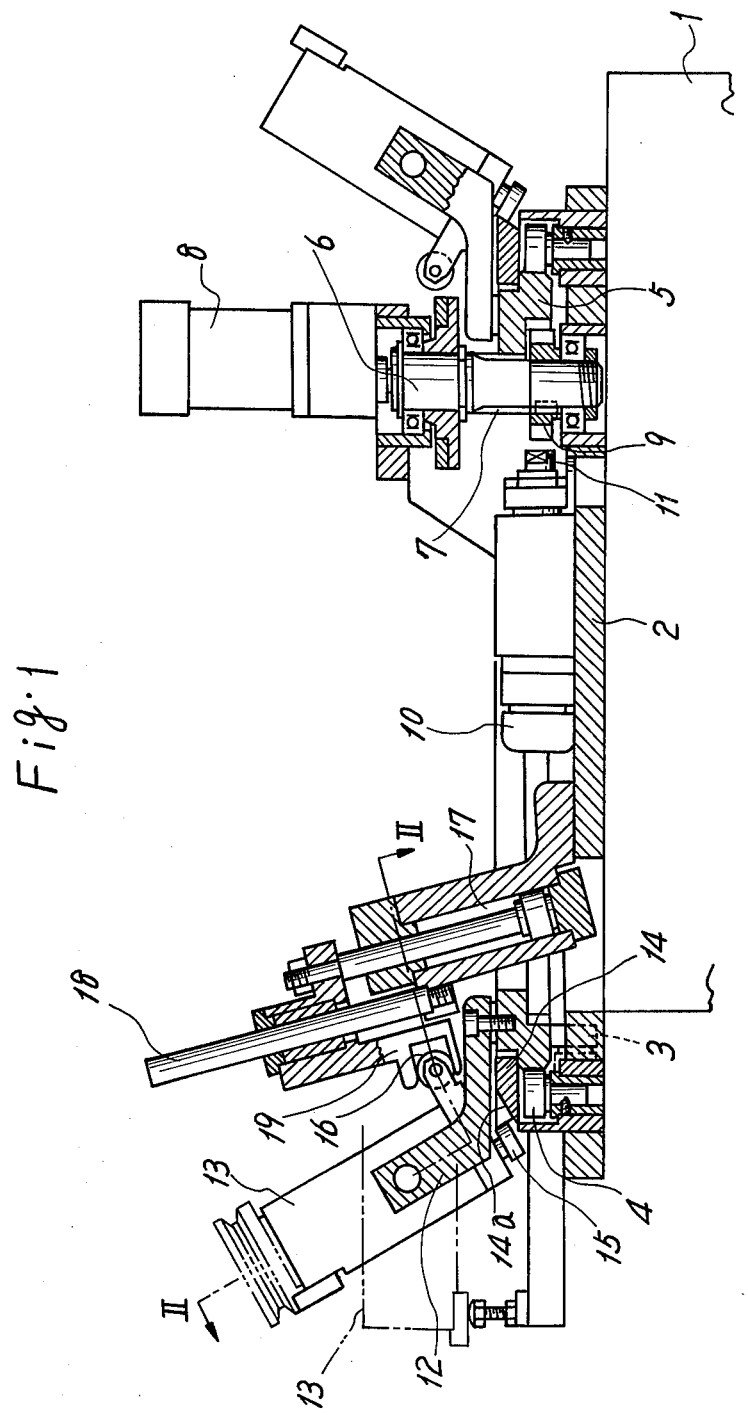
FIG. 1 is a fragmentary sectional view of a tool storage magazine according to the present invention.

Referring now to the drawings, wherein like reference numerals or characters refer to identical or corresponding parts throughout the several views, and more particularly to FIG. 1, there is shown a magazine base 1 for storing a plurality of tools. A support plate 2 is fixedly mounted on the magazine base 1 and supports a plurality of support rollers 3 and guide rollers 4 in the circumferential direction to rotatably support a rotary magazine plate 5 provided with an internal gear. An index shaft 6 is rotatably supported on the support plate 2 and is drivingly connected to an index motor 8 mounted on the support plate 2. The index shaft 6 is provided with a pinion 7 in meshing engagement with the internal gear of the magazine plate 5 in such a manner that when the index shaft 6 is rotated one revolution, the magazine plate 5 is rotated one pitch or a distance between two adjacent tool sockets 13. An index plate 9 is secured to the index shaft 6 and is provided with an index notch. A hydraulic actuator 10 is fixedly mounted on the support plate 2 and has a slidable piston rod which is connected to an index pin 11. When the magazine plate 5 is indexed to a required position, the index pin 11 is moved by the hydraulic actuator 10 into engagement with the notch of the index plate 9 to hold the magazine plate 5 at the required position.

As shown in FIG. 2, a plurality of tool sockets 13 for holding tools are pivotally supported by holding blocks 12 in equi-spaced relationship with each other in a circumferential direction. Each holding block 12 has a projection 12a which is formed with coaxial bearing bores on opposite sides thereof to receive respective spherical bearing members 21. A support pin 20 is press-fitted at one end thereof into the spherical bearing member 21 to be pivotable relative to the projecton 12a of the holding block 12 and at the other end thereof into a pin bore formed on the tool socket 13. Accordingly, each projection 12a of the holding block 12 pivotally supports a pair of support pins 20, one being fitted into one side of a tool socket and the other being fitted into the other side of another adjacent tool socket. The two support pins 20 fitted into the opposite sides of the tool socket are in coaxial alignment with each other.

Accordingly, the pair of support pins 20 are supported on the holding block 12, with the axes thereof being intersected with each other by means of the respective spherical bearing members 21, although the bearing bores to receive the spherical bearing members 21 are formed coaxially on the holding block 12 in a simple machining operation. Furthermore, even if there is a machining error in making coaxial bearing bores on the holding block 20, the tool socket can be precisely supported by use of the spherical bearing members 21.

Referring back to FIG. 1, each tool socket 13 is provided with a guide roller 15 which is held in engagement with an inclined surface of a ring member 14 secured on the support plate 2 so as to be outwardly inclined. The tool socket 13 is also provided with another roller 16, which is engaged with an engaging member 19 in the tool change position. The ring member 14 has a recess 14a at the tool change position, to release engagement between the guide roller 15 and the inclined surface of the ring member 14. The engaging member 19 is connected to a hydraulic actuator 17 mounted on the support plate 2 and is guided by a guide bar 18. Accordingly, when each tool socket 13 is positioned at the tool change position, the guide roller 15 thereof is disengaged from the inclined surface of the ring member 14 and the roller 16 thereof is engaged with the engaging member 19. When the hydraulic actuator 17 is then actuated, the tool socket 13 is pivoted by the engaging member 19 to a horizontal position for an automatic tool change operation.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool storage magazine for a machine tool with an automatic tool change apparatus comprising:
   a magazine base;
   a magazine plate rotatably supported on said magazine base;
   drive means for rotating said magazine plate;
   a plurality of holding blocks mounted on said magazine base in a circumferential direction;
   each holding block having bores on opposite sides thereof;
   a spherical bearing member received in each bore of said each holding block;
   a plurality of tool sockets to be pivotally supported in equi-spaced relationship with each other in a circumferential direction for holding tools;
   each tool socket being arranged between two adjacent holding blocks and having bores on opposite sides thereof;
   a support pin fitted at one end thereof into said spherical bearing member to be pivotable relative to the associated holding block and fitted at the other end thereof into the bore of the associated tool socket;
   first means for holding tool sockets in outwardly inclined positions;
   second means for rendering said first means inoperative at a tool change position; and
   third means for moving any one of said tool sockets positioned at the tool change position from the inclined position to a horizontal position for an automatic tool change operation.

2. A tool storage magazine as claimed in claim 1, wherein the bores formed on opposite sides of each holding block are coaxial.

3. A tool storage magazine as claimed in claim 2, wherein the bores formed on opposite sides of each tool socket are coaxial.

4. A tool storage magazine as claimed in claim 1, wherein said support pin is press-fitted into said spherical bearing member and the bore of the tool socket.

* * * * *

UNITED STATES PATENT AND TRADEMARK OFFICE
CERTIFICATE OF CORRECTION

PATENT NO. : 4,069,918
DATED : January 24, 1978
INVENTOR(S) : Inoue et al

It is certified that error appears in the above-identified patent and that said Letters Patent are hereby corrected as shown below:

Please insert the following in the above-identified patent:

--[30] Foreign Application Priority Data

August 16, 1976   Japan................51-108794--

Signed and Sealed this

Fifteenth Day of August 1978

[SEAL]

Attest:

RUTH C. MASON
*Attesting Officer*

DONALD W. BANNER
*Commissioner of Patents and Trademarks*